United States Patent [19]

Mastronardi

[11] 4,247,865
[45] Jan. 27, 1981

[54] ALTERNATE FRAME SHIFT COLOR VIDEO DISPLAY TECHNIQUE

[75] Inventor: James A. Mastronardi, Verdun, Canada

[73] Assignee: Northern Telecom Limited, Montreal, Canada

[21] Appl. No.: 44,860

[22] Filed: Jun. 4, 1979

[51] Int. Cl.³ .................. H04N 9/491; H04N 9/535
[52] U.S. Cl. ........................................ 358/4; 358/8; 358/10; 358/17
[58] Field of Search .................. 358/4, 8, 10, 11, 35, 358/17, 141, 12

[56] References Cited

U.S. PATENT DOCUMENTS 4,093,959  6/1978  Hedlund ........................ 358/4

*Primary Examiner*—Robert L. Richardson
*Attorney, Agent, or Firm*—Achmed N. Sadik

[57] ABSTRACT

An apparatus as disclosed for displaying a stored single frame NTSC color video signal on a TV monitor comprising a delay line for delaying every alternate retrieved frame by one-half the color sub-carrier period prior to their application to the monitor.

10 Claims, 2 Drawing Figures

ALTERNATE FRAME SHIFT COLOR VIDEO DISPLAY TECHNIQUE

FIELD OF THE INVENTION

The present invention relates to methods and apparatus for processing video signals and particularly to a method and apparatus for processing a stored single frame NTSC colour signal for viewing on a NTSC TV monitor.

BACKGROUND OF THE INVENTION

As colour television was introduced in order to maintain compatibility with black-and-white requirements, chrominance information was superimposed on the black-and-white intensity signal in the form of a phase and amplitude modulated sub-carrier signal. The intensity (luminance) signal, having a bandwidth of 4 Megahertz but having most of its power in the lower portion of the spectrum, did not suffer appreciably from the 1.5 Mhz wide chrominance signal centred around a frequency of 3.579545 Mhz, the so-called colour sub-carrier. However, to minimize the interference caused by the colour sub-carrier with the basic luminance information signal, it was necessary for the phase of the colour sub-carrier to appear inverted with respect to the luminance signal from frame to frame. Thus the interference, in the form of a ripple superimposed on the intensity pattern of picture lines, is averaged out due to the persistance of human vision.

Such an apparent phase inversion was simply achieved by choosing a colour sub-carrier frequency which is a half odd multiple of the frame frequency. Given a frame frequency of 29.9770026 per second (close enough to the original monochrome frame rate of 30 frames/second) the colour sub-carrier was chosen to be exactly 119437.5 times that, which yields the sub-carrier frequency of 3.579545 Mhz. A more rigorous description of what actually happens is that due to this half odd-multiple relationship the peaks of energy in the colour sub-carrier fall between the peaks in the luminance signal spectrum, and so are of minimum visibility when viewed on a monochrome receiver. This and a related succinct discussion of the NTSC colour format is given in part of a paper by John O. Limb et al titled Digital Coding of Colour Video Signals—A Review and published November 1977 in IEE (Institute of Electrical and Electronics Engineers) Transactions on Communications, Vol. Com-25, No. 11, at pages 1353 to 1355.

To summarize, this apparent phase shift of the colour sub-carrier between successive frames is a result of the half odd-multiple relationship between sub-carrier and frame frequencies.

A problem, however, arises when a single video frame is stored for viewing as a still picture. Whether a frame is stored in a VTR (Video Tape Recorder) with "Stopped frame" capability or in a single frame digital image store, in repetitive retrieval of the stored frame the same information is repeated over and over. Consequently, the reference colour sub-carrier burst always appears in the same fixed phase relationship with respect to all other elements of the composite signal, horizontal synchronization pulse and all. What this actually means is that an abrupt phase change of 180° occurs in the chrominance signal, including the reference sub-carrier burst, at the beginning of each frame. Since this burst is used as reference for locking the TV monitor's internal sub-carrier oscillator, the oscillator must adjust its output phase by 180° to maintain phase synchronization with the incoming signal in order to decode the chrominance signal correctly. This however typically takes a few milliseconds because such oscillators are designed to have a very tight phase lock (high inertia) since they must maintain their phase without correction for the duration of a full line after the short period of the reference burst at the beginning of every line. The long period required for the reference oscillator to lock in on the new phase would cause a good portion of the picture (frame) to be unacceptably distorted in colour.

PRIOR ART OF THE INVENTION

In an article published August 1976 in the SMPTE (Society of Motion Picture and Television Engineers) Journal, Vol. 85, No. 8, entitled, "The Electronic Still Store: A Digital System for the Storage and Display of Still Pictures", the authors W. G. Connoly and J. Diermann describe briefly that—luminance is separated from chrominance by means of digital filtering—chroma phase is inverted to reproduce the four-field NTSC colour signal from the two fields stored on the disc, and the chrominance and luminance signals are recombined. The Digital signal is then transformed back to the analog domain and, finally, sync and burst are reinserted via a processing amplifier.

An Electronic Still Store utilizing the above quoted technique was manufactured and sold by Ampex Corporation, of Redwood City, Calif., U.S.A.

It will be appreciated by those skilled in the art that the process of separating the luminance and chrominance signals, be it performed by analog or digital techniques, in order to generate the 4-field (i.e. 2-frame) signal necessary for the display of a colour still picture, is somewhat complex and still exhibits problems due to residual chrominance after filtering.

SUMMARY OF THE INVENTION

An object of the present invention is to simplify the process of generating two frames suitable for colour TV display from the single stored frame, whether the frame is stored in analog or in digital form.

A feature of the present invention is that it utilizes a simple analog delay and a few logic components to achieve this object.

A disadvantage of the present invention, however, is that the resultant 2-frame signal is not strictly in adherence with the NTSC standard format. The discrepancy, though, from the standard format is so minor that no noticeable degradation in the picture has been observed.

The solution of the present invention is to simply delay every alternate frame by a period equal to one-half the period of colour sub-carrier frequency, a delay of a few nanoseconds. The ½ period delay, very small compared to the duration of a picture line, causes the colour reference burst to reach the TV monitor (or receiver) with the phase in approximate coincidence with the phase of the internal reference oscillator of the monitor. Thus the tightly locked oscillator remains in proper phase-lock and the displayed colour thereby undistorted.

Thus, in accordance with the present invention, there is provided apparatus for continuously displaying on an NTSC television monitor a single video frame NTSC colour signal stored in a video signal source, characterized by delay means adapted to delay said NTSC colour signal by a predetermined time interval, and video signal switching means controllable to alternately switch to an output said NTSC colour signal output by one of said video source and said delay means.

Further according to the present invention, a signal processing method for continuously displaying on an NTSC television monitor a stored single frame NTSC colour signal, characterized by the step of delaying every alternate retrieved frame by a time interval substantially equivalent to one-half the period of the colour subcarrier frequency in said stored single frame NTSC colour signal prior to application of said every alternate retrieved frame to said NTSC television monitor; the other retrieved frames being applied to the monitor undelayed but processed through a substantially identical signal path and not including said delaying step.

Normally, such predetermined time interval would be equal to one-half the period of the colour sub-carrier frequency of the stored single frame. But clearly odd multiples of the one-half period are equivalent to one-half period for purposes of phase locking and would result in the same effect, although the NTSC format, and thus the displayed picture, would become progressively degraded as the odd multiple grows.

In the foregoing, the words television and monitor are to be considered synonymous. The important point is that the "set" be capable of accepting a base-band video signal directly, otherwise it is necessary to modulate the base-band signal on a suitable carrier to be applied to the TV set in the same manner as, say, a cable signal.

BRIEF DESCRIPTION OF THE DRAWINGS

A preferred embodiment of the present invention will now be described in conjunction with the accompanying drawings in which.

DESCRIPTION OF THE PREFERRED EMBODIMENT

Figure 1:
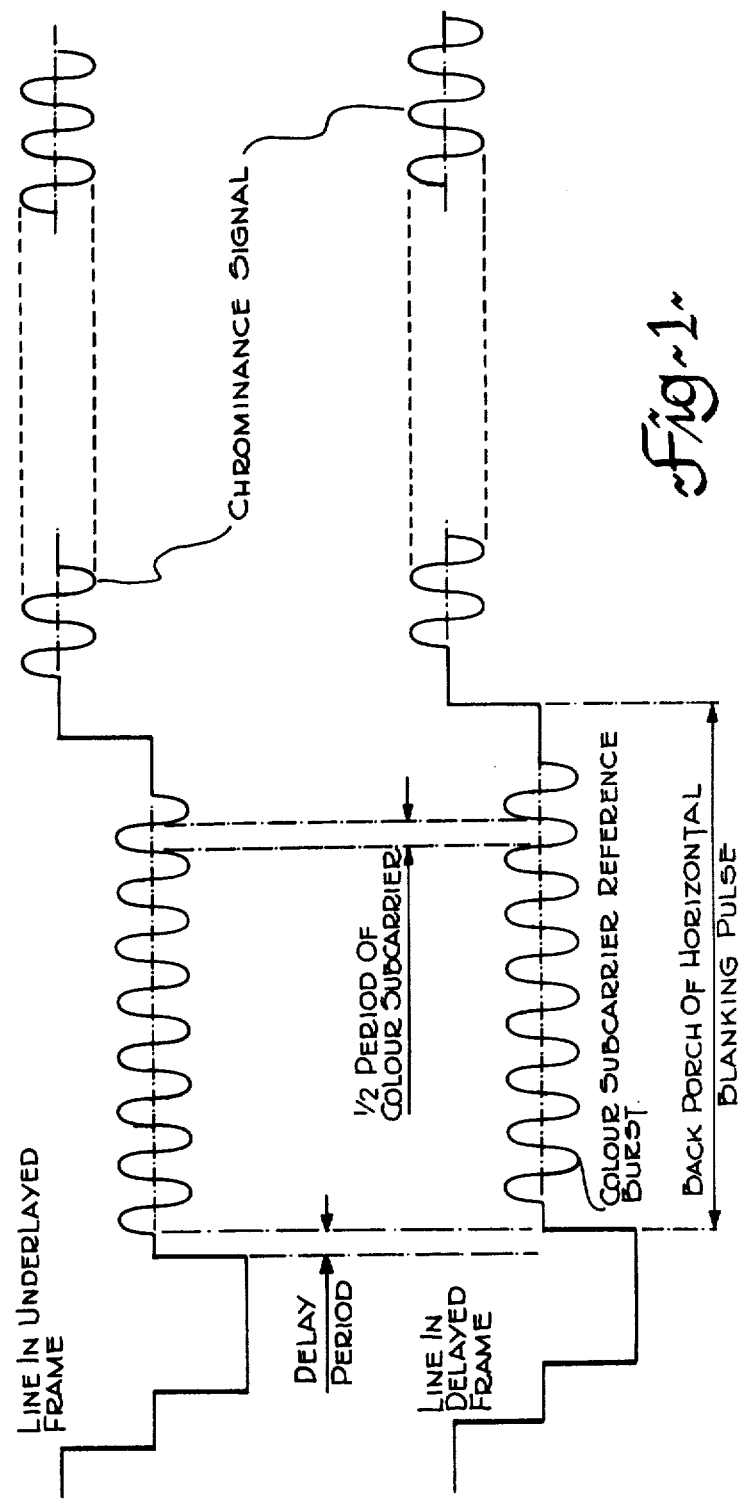
FIG. 1 is an illustration of the phase relationship between two lines one from a delayed and one from a non-delayed retrieved frame.

In FIG. 1 of the drawings, the top graph depicts the beginning of a line in a non-delayed retrieved frame. The synchronizing colour sub-carrier reference burst (about 8 to 10 cycles thereof) is superimposed on the "back porch" of each horizontal blanking pulse. The phase of the local oscillator in the TV monitor is locked to this reference burst at the line beginning so that its output may serve as a phase reference for the actual chrominance information. The latter is superimposed on the luminance signal in the form of the amplitude and phase modulated colour sub-carrier. The bottom graph in FIG. 1 depicts a line from a delayed retrieved frame, and as may be seen, the sole difference is in the brief ½-period delay on the whole line from the point in time when the line should have normally occurred if the frame containing it were not delayed. Of course, every line in that frame is also delayed by the same ½-period.

Figure 2:
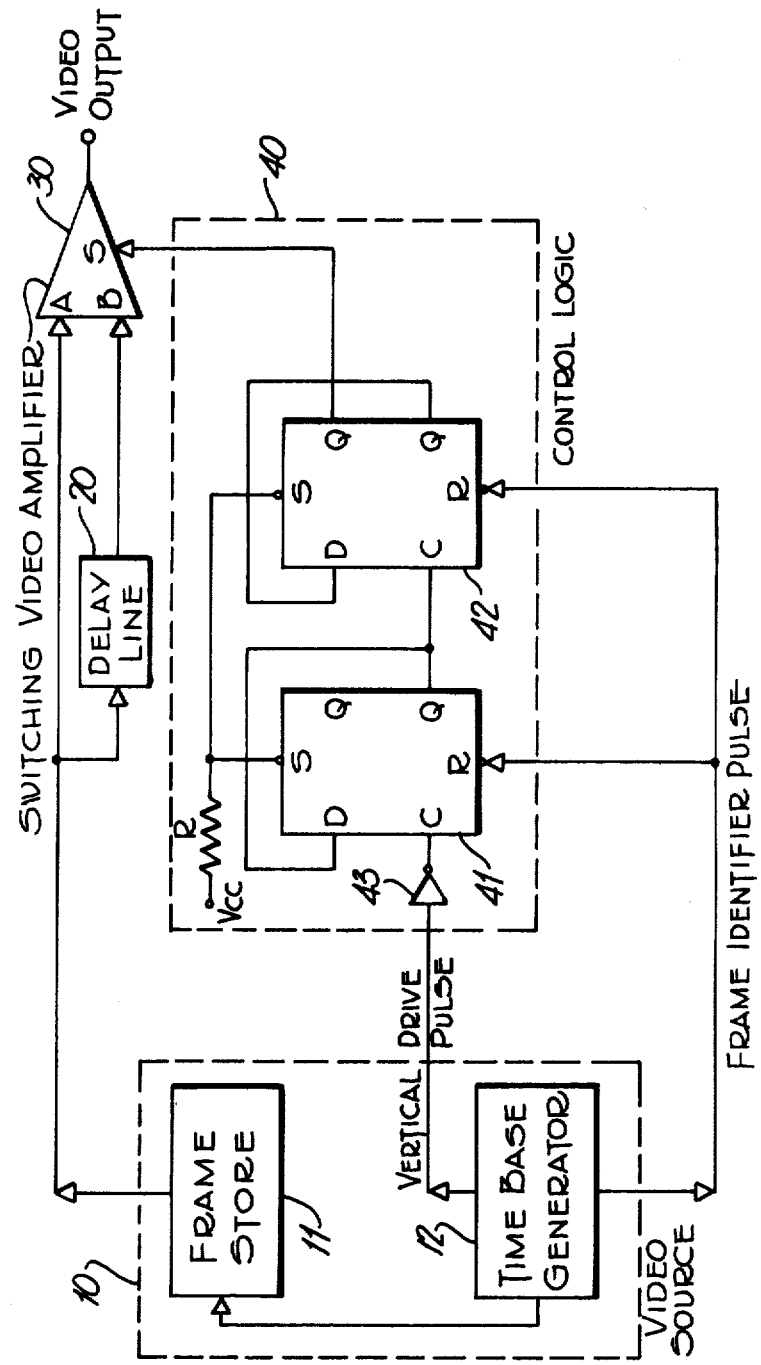
FIG. 2 is a schematic diagram of an alternate frame shift circuit suitable for implementing the present invention.

FIG. 2 of the drawings shows a simple block diagram for the alternate frame shift circuit. A video source 10 outputs a repeated two-field video frame in analog form, which signal is applied in parallel to a delay line 20 and to input A of switching video amplifier 30. The output of the delay line 20 is applied input B of the switching video amplifier 30. The output of the amplifier 30 labelled "Video-Output" delivers the desired end signal to the TV monitor or receiver (standard NTSC receiver). The video source 10 also delivers a vertical drive pulse and a frame identifier pulse, which are both applied to a control logic circuit 40. The output of the control logic 40 is applied to the switching control input 5 of the switching video amplifier 30.

In the present embodiment the video source 10 comprises a frame store 11 and a video timebase generator 12. The frame store 11 may be digital or analog, but would ultimately have an analog output if digital by decoding the signal in a video decoder. The timebase generator 12 could be a device such as manufactured by Leitch part No. CTG 200/120N. The control logic circuit 40 simply comprises two flip-flops 41 and 42 interconnected as shown. It operates in the following manner. Flip-flops 41 and 42 form a 2 bit cascaded counter clocked by the vertical drive pulse from the generator 12 through inverter 43. Vertical drive occurs once each field time during the vertical retrace period; as a result, the flip-flop 41 toggles at the field rate and the flip-flop 42 at the frame rate. The presence of the frame identifier pulse at the R (reset) inputs of the flip-flops 41 and 42 ensures synchronization between the counter "state" and the two frame cycle of the video signal. Consequently, the Q output of the flip-flop 42 specifies the frame number ("0"=odd, "1"=even) of the continuous video signal. With this Q output fed into the switching input S of the amplifier 30, operation is such that the undelayed video signal (input A) appears at the output during odd frame periods and the delayed signal (input B) appears at the output during the even frame periods. The time delay introduced by the delay line 20 must be equal to one half the period of the colour sub-carrier frequency, or 140 nanoseconds. A delay line to provide the delay of 140 nanoseconds at a bandwidth of ca. 5.5 Megahertz is readily available from several video equipment manufacturers (i.e. Barnett and Longmore, Coventry, U.K.).

It is, of course, also possible to delay every alternate digitally encoded video frame prior to decoding by the same amount of delay with the same result, provided that the two signal paths (delayed and undelayed) are identical except for the delay.

What is claimed is:

1. Apparatus for continuously displaying on an NTSC television monitor a single video frame NTSC colour signal stored in a video signal source, characterized by delay means adapted to delay said NTSC colour signal by a predetermined time interval and video signal switching means controllable to alternately switch to an output said NTSC colour signal output by one of said video source and said delay means.

2. Apparatus as claimed in claim 1, said predetermined time interval being equivalent to one-half the period of the colour sub-carrier frequency of said NTSC signal, and said video signal switching means being two video signal inputs, receiving said NTSC colour signal one from said video store and the other from said delay means and having an output.

3. Apparatus as claimed in claim 2, said video signal switching means controlled to alternately connect one of said two inputs to said output in response to logic means responsive to said video source.

4. Apparatus as claimed in claim 3, said logic means responsive to vertical drive and frame identifier pulses from a video timebase generator in said video source.

5. Apparatus as claimed in claim 4 said wider signal switching means being a switching video amplifier further comprising a control input responsive to said logic means.

6. Apparatus as claimed in claims 3, 4 or 5, said video source having analog video signal storage means and wherein the output of said video signal switching means is an output of said apparatus adapted to drive a baseband television monitor.

7. A signal processing method for continuously displaying on an NTSC television monitor a stored single frame NTSC colour signal, characterized by the step of delaying every alternate retrieved frame by a time interval substantially equivalent to one-half the period of the colour sub-carrier frequency in said stored single frame NTSC colour signal prior to application of said every alternate retrieved frame to said NTSC television monitor, the other retrieved frames being applied to the monitor undelayed but processed through a substantially identical signal path not including said delaying step.

8. The method as defined in claim 7, said step of delaying being preceded by a step of converting said stored single frame NTSC colour signal to an analog format.

9. The method as defined in claim 8, said step of delaying being accomplished by splitting said colour signal into two paths, one delayed and the other undelayed, and switching alternately between the two paths.

10. The method as defined in claim 9, said switching following the incidence of a frame start signal.

* * * * *